United States Patent

Tomlinson

[15] 3,635,079
[45] Jan. 18, 1972

[54] MILES PER GALLON METER

[72] Inventor: Norvin P. Tomlinson, 3162 Sherbrook Drive, Uniontown, Ohio 44685

[22] Filed: Feb. 25, 1970

[21] Appl. No.: 14,013

[52] U.S. Cl. ............................................................73/114
[51] Int. Cl. .....................................................G01m 15/00
[58] Field of Search ..................................................73/114

[56] References Cited

UNITED STATES PATENTS 3,118,302   1/1964   Fathauer..................................73/114
3,376,737   4/1968   Timmermans..........................73/114

*Primary Examiner*—Richard C. Queisser
*Assistant Examiner*—Marvin Smollar
*Attorney*—Oldham & Oldham

[57] ABSTRACT

This invention relates to an indicating instrument assembly for installation on a vehicle to provide engine performance data to an operator in terms of miles traveled per gallon of fuel utilized. A unique electrical circuit cooperates with means to indicate fuel flow and means to indicate vehicle speed to instantaneously compute and display a miles per gallon information.

6 Claims, 7 Drawing Figures

INVENTOR.
NORVIN P. TOMLINSON
BY
Oldham & Oldham
ATTORNEYS

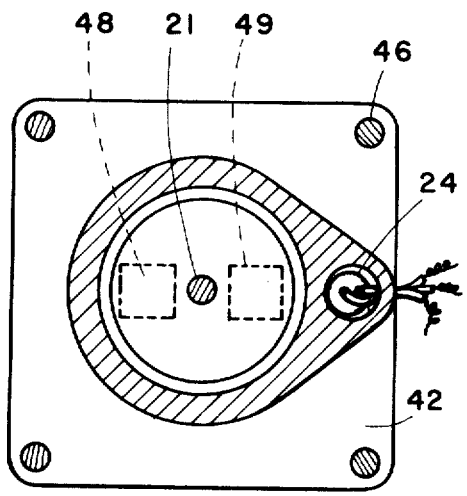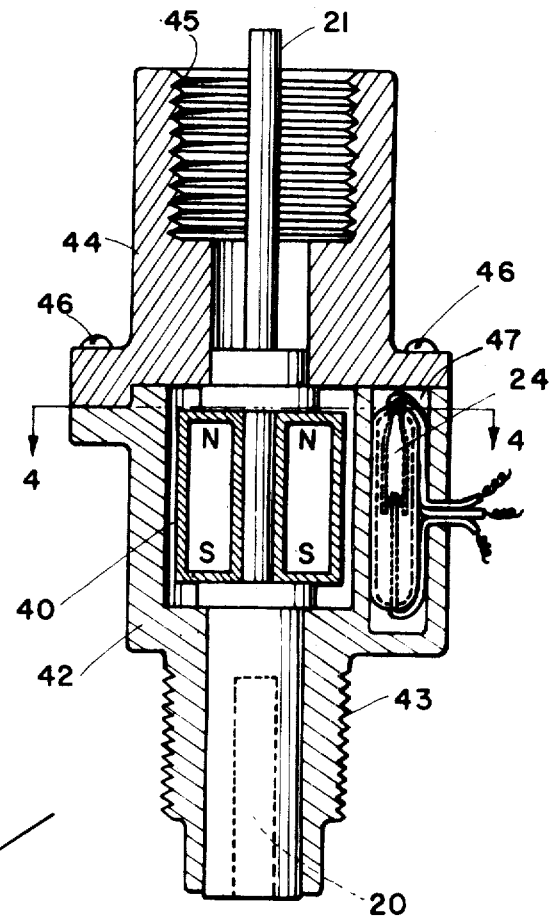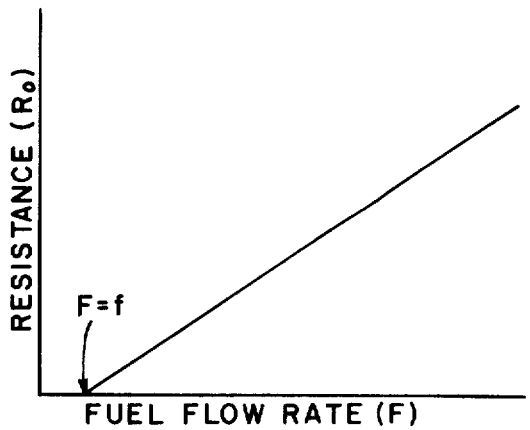

MILES PER GALLON METER

Heretofore it has been known that there have been many and various types of instruments and attempts made to provide a vehicle fuel consumption indication in terms of miles per gallon. Typical of these patents are U.S. Pat. Nos. 3,204,452, 3,058,340, 3,246,508, 2,330,159 and 3,253,459. However, these patents are all objectionable with respect to actual commercial use in incorporation on a standard automobile today because of their complexity and expense, and relative nonadaptability to the average automobile.

Therefore, it is the general object of the invention to avoid and overcome the deficiencies of these prior art patents by providing a miles per gallon indicating device that utilizes commercially available components, and is easily installed on the conventional automobile and extremely reliable in operation.

A further object of the invention is to provide a miles per gallon meter which utilizes a unique mechanical device incorporated with the speedometer cable to provide a direct indication of speed.

A further object of the invention is to provide a unique miles per gallon meter which utilizes a commercially available flow indication device cooperating with a unique electrical circuit to invert the electrical output signal therefrom and effect combination thereof with the speed indication from the speedometer cable.

The aforesaid objects of the invention and other objects which will become apparent hereinafter are achieved by providing a miles per gallon apparatus for a vehicle comprising a fuel flow meter to produce an electrical signal inversely proportional to fuel flow rate, a velocity switch actuated by the movement of the vehicle to switch in direct proportion to the speed thereof, electrical circuit means to combine the inverted electrical signal and the actuation of the switch to produce a linear electrical signal, and meter means driven by said linear electrical signal.

For a better understanding of the invention reference should be had to the accompanying drawings wherein:

FIG. 3 is a cross-sectional side view of the speed indication device associated with the speedometer incorporated in the circuit of FIG. 1; and FIG. 4 is a horizontal cross-sectional view taken on line 4—4 of FIG. 3;

FIG. 5 is a graphic representation of the relationship between the variable resistance of the flowmeter and the instantaneous fuel flow rate to the carburetor;

Figure 1:
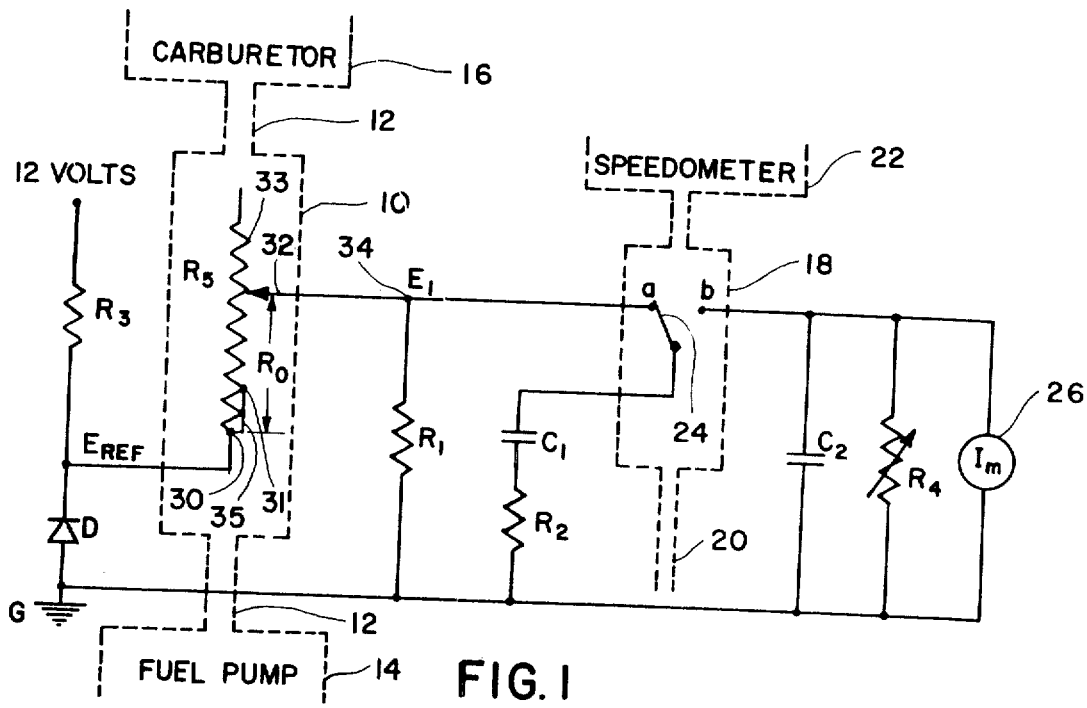
FIG. 1 is an electrical circuit diagram of the preferred embodiment of the invention.

As has been indicated above, the invention relates to an apparatus for continuously measuring and indicating the fuel mileage of a motor vehicle. Miles per gallon information requires the measurement of fuel flow rate and the speed of the motor vehicle. The fuel flow rate is obtained from a fuel flowmeter indicated by the dotted block number 10 in FIG. 1, which meter 10 is installed in a fuel line 12 between a fuel pump 14 and a carburetor 16, although alternatively the meter 10 could be installed between the fuel tank and a fuel pump (not shown). This flowmeter 10 in combination with resistance $R_1$ produces an electrical signal inversely proportional to the rate of flow (in other words one over gallons per hour).

The second item which must be measured is vehicle speed (just miles per hour). I preferably accomplished this by inserting a magnetized armature, indicated generally by dotted block 18 in FIG. 1, between a speedometer cable 20 and a speedometer 22. The structure comprising the armature switch 18 is more fully defined hereinafter, but generally, the armature activates a reed switch 24 as it rotates to provide vehicle velocity information.

An electronic circuit comprising the remainder of FIG. 1, and which components will be more fully described hereinafter, combines the signal from the flowmeter 10 with the vehicle velocity information on reed switch 24 to produce a signal proportional to their product $$\left(\frac{1}{\text{g.p.h.}} \times \text{m.p.h.} = \text{m.p.g.}\right)$$

This electrical signal is sent to a current meter 26 where it is displayed in visual information form for the vehicle operator.

FUEL FLOWMETER 10

A fuel flowmeter sensor manufactured by Teleflex Marine of North Wales, Pa., can be modified so that it can be used in my invention. This sensor by Teleflex Marine, specifically designated as 35,090, is a variable orifice type sensor having a resistance which varies linearly with fuel flow rate. Effectively the variable resistance of the flowmeter is similar to a potentiometer. This potentiometer is indicated by resistance $R_s$. The pickoff point on the potentiometer $R_s$ is indicated by arm 32, and its position will depend on the fuel flow rate passing through the sensor. The pickoff arm 32 will be at point 30 for zero flow rate and at point 33 for maximum flow rate.

Because the pickoff position of arm 32 is directly proportional to fuel flow rate, a modification is therefore required in order to obtain a signal inversely proportional to fuel flow rate. This modification is achieved by simply shorting out the bottom section of the potentiometer $R_s$ from point 30 to point 31 by a short 35. Thus, the resistance between point 30 and point 31 will be zero. Point 31 on the potentiometer $R_s$ is selected to correspond to a flow rate of $f$. The value of $f$ is a design constant, actually equal to about one-half to 1 gallon per hour. The resistance between point 30 and the pickoff arm 32 is designated as $R_o$ and varies linearly with flow rate F for flow rates equal to or greater than $f$. For flow rates less than $f$, the pickoff arm will be between point 30 and point 31 and the resistance $R_o$ will be zero.

The relationship between $R_o$ and flow rate $F$ is shown in FIG. 5 and is expressed mathematically as $$R_0 = m(F - f) \text{ for } F \geq f$$

and $$R_0 = 0 \text{ for } F \leq f$$

where F is the flow rate in gallons per hour through the flow sensor 10, and m is a design constant relating the change in the resistance $R_o$ to the change in flow rate F. The slope of the line in FIG. 5 is equal to the value of m.

A regulated reference voltage $E_{REF}$ is applied to potentiometer $R_s$ at point 30 where the flow rate is zero. A resistor $R_1$, whose value is selected to be equal to the product of m times $f$, is attached between the pickup arm 32 and ground G. The resistor $R_1$ and the resistance $R_o$ form a voltage divider network to produce a voltage $E_1$ at point 34. This voltage $E_1$ is expressed as $$E_1 = \left(\frac{R_1}{R_1 + R_0}\right) E_{REF}$$

Substituting the values $R_1 = mf$ and $R_o = m(F-f)$ into the above equation results in $E_1 = f E_{REF}/F$.

Figure 2:
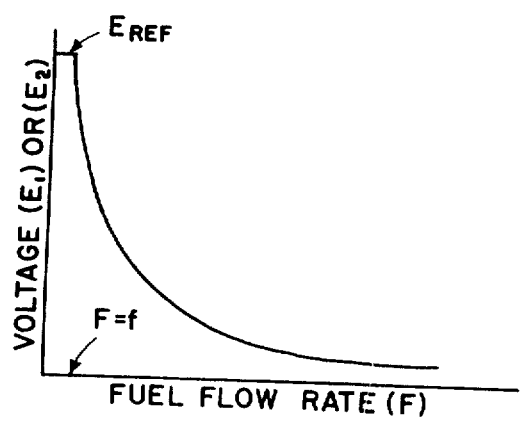
FIG. 2 is a graphic representation of the electrical output signals $E_1$ or $E_2$ from the modified fuel flowmeter 10 in the circuit of FIG. 1 illustrating the inverse relationship between the fuel flow rate F and $E_1$.

Thus the voltage ($E_1$) at point 34 is a variable voltage and inversely proportional to the flow rate F for flow rates equal to or greater than $f$. For flow rates less than $f$, the voltage $E_1$ is equal to the reference voltage $E_{REF}$ indicating a flow rate of F. FIG. 2 shows the inverse relationship between the signal voltage $E_1$ and the flow rate F for the modified fuel flowmeter.

Figure 6:
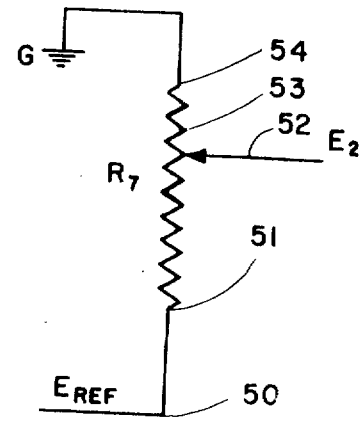
FIG. 6 is a schematic diagram of a nonlinear potentiometer through which an output signal $E_2$ is generated representing the inverse (1/F) of the fuel flow rate F.

Another method of modification can be achieved by replacing the linear potentiometer in the flow sensor with a nonlinear potentiometer $R_7$ shown in FIG. 6. Nonlinear potentiometers are made by Markite Corporation, 155 Waverly Place, N.Y. N.Y. 10014, and Duncan Electronics, Inc. of 2865 Fairview Road, Costa Mesa, Calif. 92626. The nonlinear potentiometer $R_7$ is made by means of a variable pitch winding or by means of a conductive plastic in such a manner to produce the desired nonlinear inverse relationship. The pickoff arm 52 on potentiometer $R_7$ will depend on the fuel flow rate passing through the sensor. The pickoff arm will be at position 50 for zero flow rate and at position 53 for maximum flow rate. Point 51 on potentiometer $R_7$ corresponds to the flow rate $f$ described previously. A regulated reference voltage $E_{REF}$ is attached to potentiometer $R_7$ at point 50. The other end, point 54 is attached to ground G. The voltage $E_2$ from the pickoff arm 52 is inversely proportional to flow rate F for flow rates equal to or greater than $f$. For flow rates less than $f$, the voltage $E_2$ is equal to the reference voltage $E_{REF}$ indicating a flow rate of $f$. This voltage relationship between $E_2$ and flow rate $F$ is identical to the voltage relationship between $E_1$ and flow rate $F$. Thus one curve in FIG. 2 is used to show both voltages $E_1$ and $E_2$ as a function of flow rate.

VELOCITY SWITCH

The velocity switch 18 is more clearly shown in FIG. 3. It consists of an armature 40, a two-piece housing 42 and 44 held together by appropriate bolts 46, and a double-throw reed switch 24. The hole or recess receiving the input speedometer cable is indicated by dotted line 20 with the output connector to speedometer 22 indicated by numeral 21. The connector 21 is the same as the end of the usual speedometer cable. The two pieces 42 and 44 are preferably made so that they will readily adapt to an existing speedometer cable configuration whereby the speedometer cable connecting sleeve will be received on male threads 43 and the male speedometer connection will be directly to the female threaded section 45. The armature 40, is preferably made of plastic and the preferred embodiment has two permanent magnets 48 and 49 embedded in its body at 180° relationship to each other as is best seen in FIG. 4. Two magnets are preferably used in the armature since better dynamic balance of the armature can be obtained than if only one magnet is used. The housing section 42 having a hole 47 formed therein to receive the reed switch 24 in the sliding relationship illustrated.

The reed switch 24 is a proximity type switch and is activated by the magnets in the armature as the armature rotates. With two magnets in the armature, the switch will be activated two times for each revolution of the armature. The reed switch is held in place in the housing 46 by a potting compound and electrically connected as illustrated in FIG. 1 to the overall circuit of the miles per gallon meter. A reed switch such as those typically made by Hamlin, Inc. of Lake Mills, Wis. 53551, would meet the objects of the invention.

ELECTRONICS

The electronics is shown in FIG. 1. The explanation of the circuit is as follows: The reed switch 24 is a two position switch magnetically driven by the automobile speedometer cable. The switching frequency is therefore directly proportional to the vehicle speed. The reed switch 24 allows the capacitor $C_1$ to charge in one position (position $a$) and to discharge through the meter in the other position (position $b$).

The charge and discharge current through capacitor $C_1$ is limited to a tolerable amount by the resistance $R_2$ in series with the capacitor $C_1$. This average discharge current from capacitor $C_1$ is directly proportional to the product of the voltage $E_1$ times the switching frequency of the reed switch 24. Since the voltage $E_1$ is inversely proportional to the instantaneous miles per gallon and the switching frequency is directly proportional to automobile speed, the readout current on meter 24 is therefore proportional to the instantaneous miles per gallon or $1/GPH \times MPH = MPG$.

VOLTAGE REGULATOR CIRCUIT

The power supply voltage in motor vehicles is unregulated and varies sometimes between 12 and 16 volts. A voltage regulator is therefore required in order to maintain a steady reference voltage $E_{REF}$. The voltage regulator contemplated by the invention includes a zener reference diode D and resistance $R_3$ connected is series between ground G and the 12 volts input source as indicated in FIG. 1.

CALIBRATION

In the production of this item for manufacture, it is desirable to use inexpensive electronic components. This usually can be achieved by relaxing the tolerance requirements on such parts. A wide tolerance on electronic parts usually means an inaccurate measuring device. In this case it is very desirable to have a highly accurate instrument. By means of a calibrating resistor $R_4$, it is possible to use components with wide tolerances yet have a highly accurate miles per gallon measuring device. The component design procedure is to assume $R_4$ is not in the circuit and design the circuit parameters such that the reading on the readout meter 26 for a particular miles per gallon condition is slightly greater than the actual miles per gallon as measured by a highly accurate standard flowmeter and an equally accurate speedometer. Next, $R_4$ is connected in the circuit and its resistance is adjusted so that the readout meter 24 reads the correct miles per gallon as established by the highly accurate flowmeter and speedometer. The calibrating resistor $R_4$ acts as a shunt to bypass part of the discharge current around the current meter 26.

CIRCUIT COMPONENT DESIGN

Figure 7:
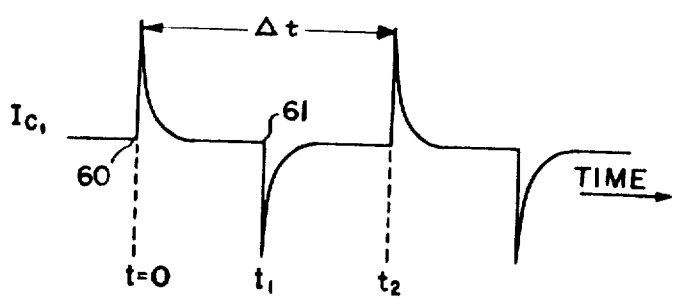
FIG. 7 is a graphic representation of charge and discharge current through capacitor $C_1$.

The value of the circuit components are determined as follows: Assume the calibration resistor $R_4$ is not in the circuit. While the reed switch 24 is in position (a) capacitor $C_1$ charges to a voltage $E_1$. This charge current $I_{(charge)}$ is represented by the waveform from point 60 to point 61 in FIG. 7 and is expressed mathematically as $$I_{(charge)} = \frac{E_1}{R_2} e^{-t/(R_2C_1)}$$

The capacitor $C_1$ discharges through the meter 26 while the reed switch 24 is in position (b). Capacitor $C_2$ is a filter to provide a steady reading on the readout meter 26.

The average charge current through capacitor $C_1$ for each cycle of switch operation is expressed as $$I_{AVE(charge)} = \frac{1}{\Delta t} \int_0^{t_1} I_{(charge)} \, dt$$

where $\Delta t$ is the time in seconds for one complete cycle of switch operation. Combining the two previous equations results in $$I_{AVE(charge)} = \frac{1}{t} \int_0^{t_1} \frac{E_1}{R_2} e^{-t/(R_2C_1)} \, dt$$

This previous equation can easily be integrated to give $$I_{AVE(charge)} = \frac{E_1 C_1}{\Delta t}$$

The meter 26 measures the average discharge current, and since the average discharge current must be equal to the average charge current, the current through the meter 26 is therefore $$I_M = E_1 C_1 / \Delta t$$

The standard rotational rate for the speedometer cable of American automobiles is 1,000 revolutions per minute for an automobile velocity of 60 miles per hour. This establishes the following relationship:

$$W = S/3.6,$$

where $W$ is the speedometer rotational rate in revolutions per second and $S$ is the speed of the automobile in miles per hour.

With two magnets attached to the speedometer cable, as shown in FIGS. 3 and 4, the reed switch 24 completes one cycle of switch operation for one-half rotation of the speedometer cable. Therefore the time ($\Delta t$) for one cycle of switch operation is $$\Delta t = 1/2W$$

Combining the above two previous equations results in $$\Delta t = 1.8/S$$

This expression gives the relationship of automobile speed $S$ to cycle time $\Delta t$ of the reed switch 24. Combining this equation with a previous derived equation ($I_M = E_1 C_1 / \Delta t$) gives the following relationship $I_M = E_1 C_1 S / 1.8$ This equation shows that the current through the meter is proportional to the product of the variable voltage $E_1$ and the automobile speed $S$. Previously it has been shown that the voltage $E_1$ is inversely proportional to fuel flow rate ($E_1 = f E_{REF}/F$).

By combining these above relationships the following relationship exists:

$$I_M = \left[ \frac{C_1 f E_{REF}}{1.8} \right] \frac{S}{F}$$

The design constants inside the brackets in the above equation establish the scale factor relationship between miles per gallon and the sensitivity of the current meter. The units for the above equation are as follows: $I_M$ is the meter current in microamperes, $E_{REF}$ is the regulated reference voltage in volts, $C_1$ is the value of capacitance in microfarads, $f$ is the flow rate constant in gallons per hour, $F$ is the instantaneous flow rate through the flowmeter in gallons per hour, and $S$ is the instantaneous automobile speed in miles per hour. Thus by proper choice of design constants, the reading on the readout meter 26 reads a linear relationship of instantaneous miles per gallon.

For a typical circuit configuration having a 12-volt supply voltage as shown in FIG. 1, the following values would be present for the components illustrated: $R_1$ 125 ohms; $R_2$ 1,000 ohms; $R_3$ 100 ohms; $R_4$ 20,000 ohms; $E_{REF}$ 6 volts; meter sensitivity 0 to 50 microamperes.

It is true that an error exists in a reading for flow rates less than $f$. The value of $f$ can be made small such that this error occurs only at low rates. As mentioned previously, the practical value of $f$ would be approximately ½ to 1 gallon per hour.

Hence, it is seen that the objects of the invention have been achieved by modifying a conventional fuel flowmeter to produce a signal inversely proportional to fuel flow rate, and combining this with a unique electronic circuit having a speed indication actuating a reed switch to allow the combination to be read directly as a current flow through a current meter, with this indication directly indicating miles per gallon for the vehicle. The unique incorporation of the reed switch into the movement or rotation of the speedometer cable together with the electrical circuit utilizing this technique achieves the low cost and highly efficient system of the invention.

While in accordance with the patent statutes only the best known embodiment of the invention has been illustrated and described in detail, it is to be particularly understood that the invention is not limited thereto or thereby but that the inventive scope is defined in the appended claims.

What is claimed is:

1. A miles per gallon apparatus, comprising:
   means for producing an electrical signal the voltage of which is inversely proportional to fuel flow rate, the means including a fuel flowmeter;
   a capacitor;
   meter means for providing a visual indication of miles per gallon; and
   a speed switch actuated by movement of the vehicle to switch between first and second positions in direct relation to the vehicle speed, the switch connecting the capacitor in charging relation to the means for producing an electrical signal when in the first position and in discharging relation through the meter means when in the second position.

2. Apparatus according to claim 1 wherein the fuel flowmeter has a variable resistance directly proportional to fuel flow rate and wherein the means for producing an electrical signal further includes circuit means associated with the full flowmeter for producing the inversely proportional signal.

3. An apparatus according to claim 1 which includes means to regulate the input voltage to the fuel flowmeter.

4. An apparatus according to claim 3 which includes variable resistance means positioned in parallel with the meter means to provide calibration of all circuit components for accuracy of the meter reading.

5. An apparatus according to claim 1 where the velocity switch comprises a speedometer cable, an armature interconnected with the cable to rotate directly therewith, at least one permanent magnetic means carried by the armature, a housing surrounding and supporting the armature and the speedometer cable, and a magnetic actuated reed switch carried in the housing in proximity to the armature so as to be actuated by each permanent magnet upon its rotation thereby.

6. Apparatus according to claim 1 wherein the fuel flowmeter has a nonlinear variable resistance to directly produce the electrical signal inversely proportional to fuel flow rate.

* * * * *